US009652442B1

(12) United States Patent
Charytoniuk et al.

(10) Patent No.: US 9,652,442 B1
(45) Date of Patent: May 16, 2017

(54) VIRTUAL PHOTO WALL

(71) Applicant: Google Inc., Mountain View, CA (US)

(72) Inventors: Tomasz Charytoniuk, San Francisco, CA (US); Dmitry Shapiro, San Francisco, CA (US)

(73) Assignee: Google Inc., Mountain View, CA (US)

( * ) Notice: Subject to any disclaimer, the term of this patent is extended or adjusted under 35 U.S.C. 154(b) by 118 days.

(21) Appl. No.: 14/164,080

(22) Filed: Jan. 24, 2014

(51) Int. Cl.
G06F 17/00 (2006.01)
G06F 17/22 (2006.01)
G06F 17/30 (2006.01)

(52) U.S. Cl.
CPC .... *G06F 17/2247* (2013.01); *G06F 17/30241* (2013.01)

(58) Field of Classification Search
None
See application file for complete search history.

(56) References Cited

U.S. PATENT DOCUMENTS

| 8,060,463 | B1 | 11/2011 | Spiegel |
| 8,428,098 | B2 | 4/2013 | Chen et al. |
| 2003/0069848 | A1 | 4/2003 | Larson et al. |
| 2004/0264810 | A1* | 12/2004 | Taugher ............ G06F 17/30247 382/305 |
| 2009/0171939 | A1* | 7/2009 | Athsani ............ G06F 17/30241 |
| 2010/0250672 | A1* | 9/2010 | Vance et al. .................. 709/204 |
| 2011/0238755 | A1 | 9/2011 | Khan et al. |
| 2012/0020578 | A1* | 1/2012 | Yadid ................ G06K 9/00664 382/229 |
| 2013/0111354 | A1* | 5/2013 | Marra et al. .................. 715/751 |

FOREIGN PATENT DOCUMENTS

WO 2009098695 A2 8/2009

OTHER PUBLICATIONS

Highlight About, <http://highlig.ht/about.html>, accessed on Jan. 23, 2014, 1 page.
Scoble, "The two hottest apps you'll 'run into' at SXSW," Feb. 24, 2012, <http://thenextweb.com/apps/2012/02/24/the-two-hottest-apps-youll-run-into-at-sxsw/>, 8 pages.
Crocker, "Proximity-based mobile social networking: outlook and analysis," Feb. 5, 2013, GIGAOM PRO, <http://www.slideshare.net/Datafield/proximity-basedmobilesocialnetworkingoutlookandanalysis>, 38 pages.

(Continued)

*Primary Examiner* — Keith Bloomquist
(74) *Attorney, Agent, or Firm* — McDermott Will & Emery LLP

(57) ABSTRACT

In one aspect, a machine-implemented method for facilitating a virtual content wall corresponding to a point of interest is provided. The method includes receiving a content item generated at a user device, determining a geographic location associated with the content item, identifying a point of interest having a geographic location that matches the geographic location associated with the content item and adding the content item to a set of content items corresponding to the point of interest. Other aspects can be embodied in corresponding systems and apparatus, including computer program products.

18 Claims, 3 Drawing Sheets

(56) References Cited

OTHER PUBLICATIONS

Victor H., "Apple patents proximity-based social networking app," Jun. 17, 2011, <http://www.phonearena.com/news/Apple-patents-proximity-based-social-networking-app_id19662>, 3 pages.

Schapsis, "Location Based Social Networks, Location Based Social apps and games—Links," BDNooz LBS Strategies, Jul. 24, 2013, <http://bdnooz.com/lbsn-location-based-social-networking-links/#axzz2YwhSG5Xv>, 41 pages.

"Heading to Coachella? Find the best things to do before, during, and after the festival with the new Foursquare," Apr. 12, 2013, <http://blog.foursquare.com/2013/04/12/heading-to-coachella-find-the-best-things-to-do-before-during-and-after-the-festival-with-the-new-foursquare/>, 2 pages.

Kaiser, "Facebook Offers 'Find Friends Nearby' Feature for Adding New People," Jun. 25, 2012, <http://www.dailytech.com/Facebook+Offers+Find+Friends+Nearby+Feature+for+Adding+New+People/article25015.htm>, 2 pages.

Yelp, "Le Diplomate Cafe: Photos," May 29, 2007, <http://www.yelp.com/biz_photos/le-diplomate-cafe-irvine?select=sNpVgMApmhqCHIbcwEjLgA#sNpVgMApmhqCHIbcwEjLgA>, 4 pages.

Sonar Media, Inc. "iTunes Preview," Apr. 3, 2013, <https://itunes.apple.com/us/app/sonar-friends-nearby/id422549956?mt=8>3 pages.

Yasmo Live LTD, "iTunes Preview", Oct. 28, 2013, <https://itunes.apple.com/us/app/yasmo-live/id373975643?mt=8>, 2 pages.

Sterling, "Facebook Nearby Is Now Facebook 'Local Search'," Apr. 3, 2013, <http://searchengineland.com/facebook-nearby-is-now-facebook-local-search-154507>, 3 pages.

\* cited by examiner

VIRTUAL PHOTO WALL

BACKGROUND

Numerous services are available that allow users to indicate presence at a point of interest (POI). These services may include check-in services where the user indicates presence at a POI. The POI may be a well know location, a restaurant, event or any other location or area housing an establishment or event. In addition, to stating their presence at a POI, for example, using check-in capability of such services, users are often able to capture images while at the POI using their camera phone or other location-sensitive image capture devices.

SUMMARY

The disclosed subject matter relates to a machine-implemented method for facilitating a virtual content wall corresponding to a point of interest. The method may comprise receiving a content item generated at a user device. The method may comprise determining a geographic location associated with the content item. The method may comprise identifying a point of interest having a geographic location that matches the geographic location associated with the content item. The method may comprise adding the content item to a set of content items corresponding to the point of interest.

The disclosed subject matter also relates to a system for facilitating a virtual content wall corresponding to a point of interest. The system may comprise one or more processors and a machine-readable medium comprising instructions stored therein, which when executed by the processors, cause the processors to perform operations comprising receiving a content item generated at a user device in association with a point of interest. The operations may further comprise determining a geographic location associated with the content item. The operations may further comprise determining a geographic location associated with the point of interest. The operations may further comprise determining that the geographic location associated with the point of interest matches the geographic location associated with the content item. The operations may further comprise adding the content item to a set of content items corresponding to the point of interest.

The disclosed subject matter also relates to a machine-readable medium comprising instructions stored therein, which when executed by a machine, cause the machine to perform operations comprising receiving a content item generated at a user device in association with a point of interest. The operations may further comprise determining a geographic location associated with the content item. The operations may further comprise determining a geographic location associated with the point of interest. The operations may further comprise determining that the geographic location associated with the point of interest matches the geographic location associated with the content item. The operations may further comprise adding the content item to a set of content items corresponding to the point of interest. The operations may further comprise providing the content item for display in a virtual content wall associated with the point of interest, wherein the virtual content wall displays the set of content items.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
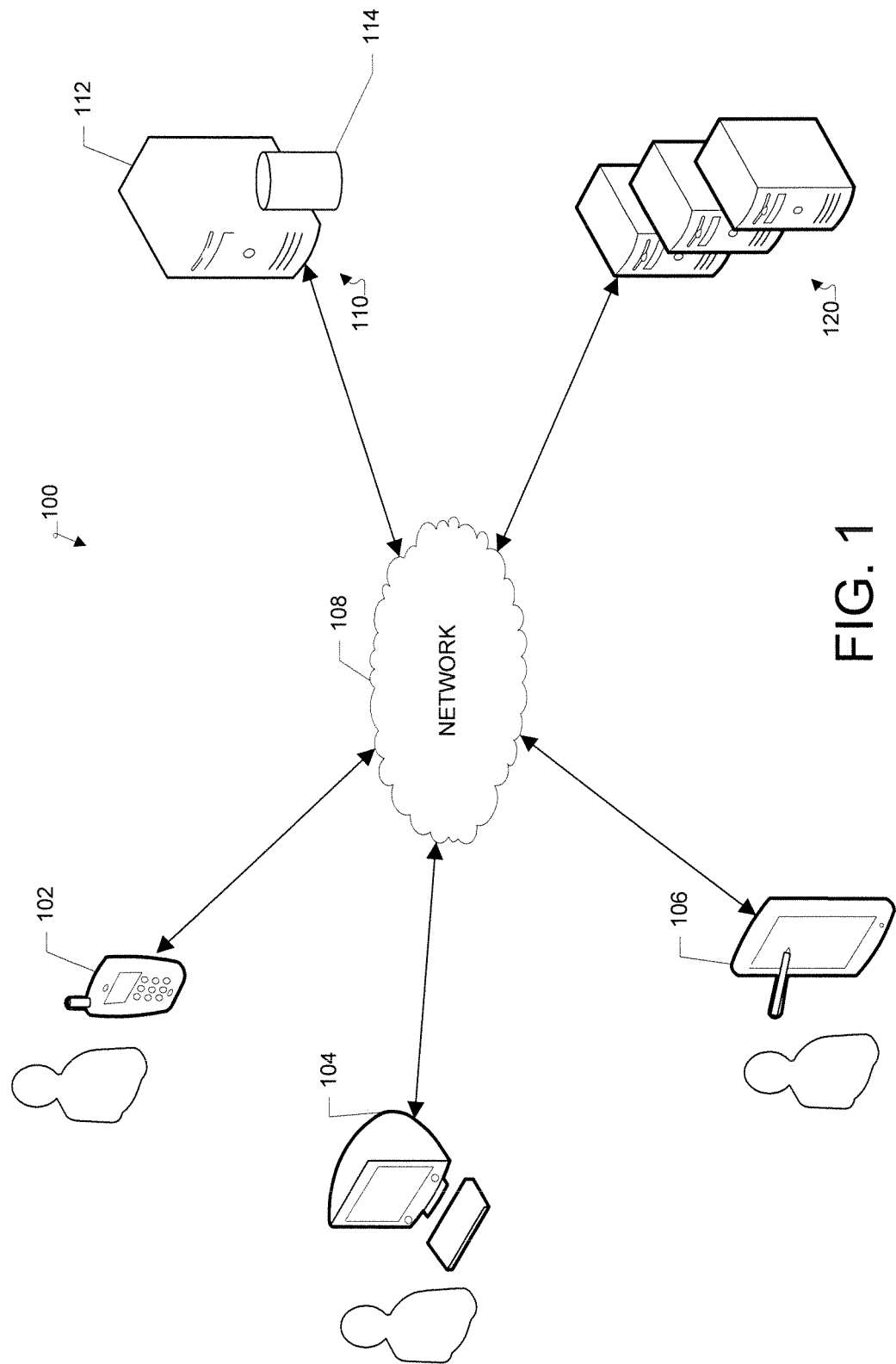
FIG. 1 illustrates an example client-server network environment, which provides for facilitating a virtual content wall corresponding to a point of interest ("POI").

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details.

The present disclosure provides a method and system for facilitating a virtual content wall corresponding to a point of interest ("POI") defined by a geographic location. User generated content such as notes, tags, links, photos and other content may be received and associated with the point of interest according to the geographic location of the content and/or point of interest. The content is then provided for display to users as a virtual content wall when it is determined that the users are interested or in proximity of the point of interest.

In one example, the association of content with a point of interest is based on determining an indication of the content being associated with a location matching the geographic location of the point of interest (e.g., an area or point defined using various geographic indicators such as an address, latitude, longitude, etc.). When content is generated, a geographic location of the content may be determined (e.g., in a similar manner). The geographic location of content may for example be defined based on the geographic location of a device used to generate the content. When it is determined that the geographic location of the content matches the geographic location or area defining the point of interest, the content is associated with the point of interest.

Any point or collection of points (e.g., an area) on the map, having a geographic location indicator, may be used as a point of interest. Accordingly, virtual content walls generally may be generated for any point or area on the map, even if the area is not associated with a specific residence, business or other defined establishment or entity. Since the association of content and an area associated with the point of interest is performed using geographic location comparison, content corresponding to and captured and/or generated at the geographic location is easily associated with the point of interest and may be viewable by others interested in or located proximate to the point of interest.

In one example, upon receiving an indication that a user is interested in the point of interest (e.g., by searching for the point of interest or otherwise) and/or when a user is proximate to the point of interest, all content associated with the point of interest is retrieved and presented as a virtual content wall to the user.

In this manner, a virtual content wall corresponding to a point of interest is facilitated. The virtual content wall may include notes, memorabilia, comments, photos of patrons or events, and other indications of activity occurring at the point of interest. In one example, the virtual content wall may be similar to a photo wall at a restaurant or establishment.

FIG. 1 illustrates an example client-server network environment, which provides for facilitating a virtual content wall corresponding to a point of interest ("POI"). A network environment 100 includes a number of electronic devices 102, 104, 106 communicably connected to a server 110 and remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In the example of FIG. 1, electronic device 102 is depicted as a smartphone, electronic device 104 is depicted as a desktop computer and electronic device 106 is depicted as a PDA.

In some implementations, server 110 includes a processing device 112 and a data store 114. Processing device 112 executes computer instructions stored in data store 114, for example, to facilitate a virtual content wall corresponding to a point of interest ("POI") using content generated by and for display to users interacting with electronic devices 102, 104, 106. Server 110 may further be in communication with one or more remote servers 120 either through the network 108 or through another network or communication means.

The one or more remote servers 120 may perform various functionalities and/or storage capabilities described herein with regard to the server 110 either alone or in combination with server 110. Server 110 may further maintain or be in communication with social networking services hosted on one or more remote server 120. The one or more social networking services may provide various services and may enable users to create a profile and associate themselves with other users at a remote social networking service. The server 110 and/or the one or more remote servers 120 may further facilitate the generation and maintenance of a social graph including the user created associations. The social graphs may include, for example, a list of all users of the remote social networking service and their associations with other users of a remote social networking service. One or more remote servers 120 may further host various services including map and/or location services (e.g., GPS or satellite location services).

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Users may interact with the system hosted by server 110, and/or one or more services hosted by remote servers 120, through a client application installed at the electronic devices 102, 104, and 106. Alternatively, the user may interact with the system and/or services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

In one example, a user interacting with a user device (e.g., electronic devices 102, 104 and/or 106) may generate content corresponding to a POI. In one example, the server 110 receives the captured content. The server 110 may further determine a location of the user device (e.g., electronic devices 102, 104 and/or 106). In one example, the location of the user device may be determined at the time of content generation. In one example, the location of the user device may be determined for a period of time proximate to the time of content generation. If the location matches the location associated with the POI, the server 110 may add the content to a virtual content wall associated with the POI. The user may, in one example, request to associate the generated content with the POI. In one example, the virtual content wall is then provided for display to one or more users (e.g., users at electronic devices 102, 104 and/or 106). In one example, the virtual content wall is displayed to users upon receiving an indication of user request to view the content wall and other indication of user interest to view the content wall (e.g., a user query, a user viewing the POI information, a user being in proximity of the POI, etc.).

Figure 2:
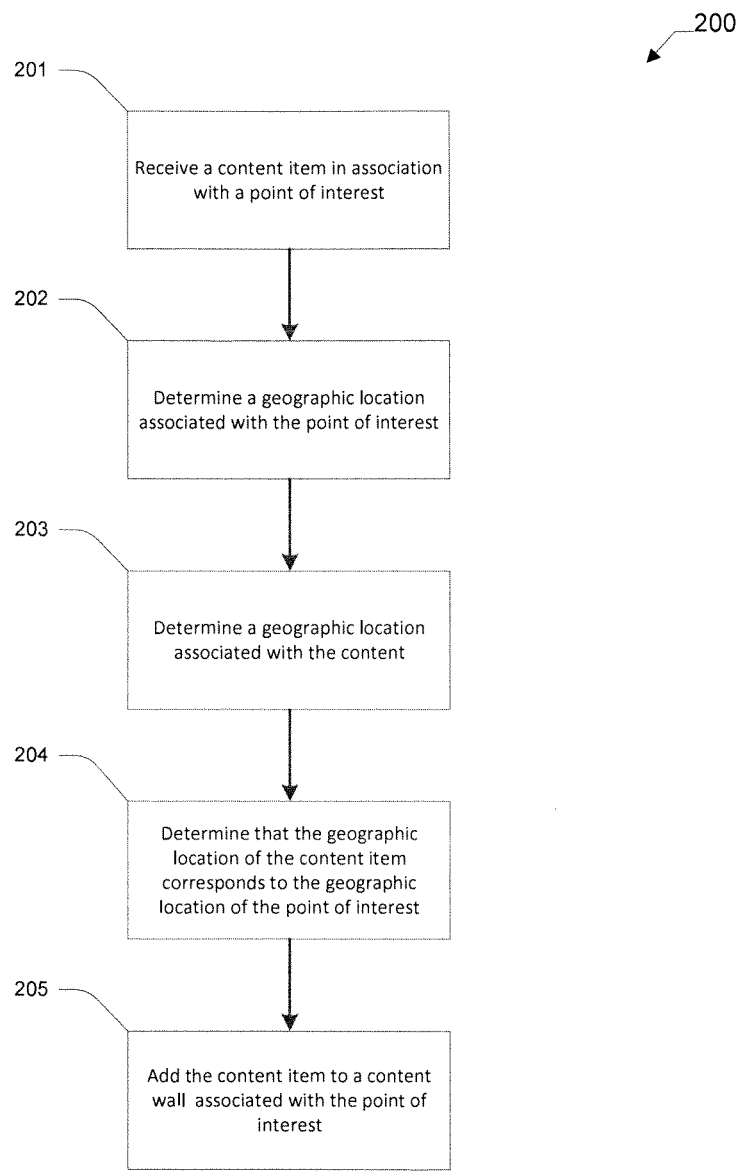
FIG. 2 illustrates a flow diagram of an example process for generating a virtual content wall corresponding to a point of interest ("POI").

FIG. 2 illustrates a flow diagram of an example process 200 for generating a virtual content wall corresponding to a point of interest ("POI"). In step 201 a content item is received. As described above, the content item is generated by a user at a user device. The content item may include notes, tags, links, photos and other content. In one example, the content may be generated using the user device proximate to the POI. In one example, the content may be generated within a threshold period of time of the user device being proximate to the POI. In one example, the content item is a photo captured of the user and other patrons while at the POI.

In step 202, a geographic location associated with the POI is determined. In one example, the POI may be associated with a geographic indicator such as an address, venue, or other indicator of the geographic location of the POI. The POI may include a long term or short term POI (e.g., a landmark, a business, a residence, a venue, a scheduled event, a pop-up event, a place associated with an occurrence, etc.).

In step 203, a geographic location associated with the content is determined. In one example, the geographic location is determined based on the location of the user device used to generate the content during content generation. In one example, the content may include geotags. The geotags may be used to determine the location of the content. In one example, the location of the content may be specified by the user.

In step 204, it is determined if the geographic location of the content item corresponds to the geographic location of the POI. For example, if the content item location determined in step 203 is proximate to the location of the POI determined in step 202 (e.g., within a threshold distance), it is determined that the content corresponds to the POI. In one example, the geographic location of the user device is determined for a period of time prior to content generation and it is determined if the user device was proximate to the POI within the threshold period of time. In one example, upon receiving an indication of a match, the detected match is provided for display to the user for confirmation.

In step 205, the content item is added to a content wall associated with the POI. In one example, the content wall includes content items captured by users at or near the POI. In one example, the virtual content wall includes content displaying activity occurring at the POI. For example, the content items can be images of patrons of the POI. The content wall may thus resemble a photo wall at an establishment in the form of a virtual content wall that is provided for display, for example, to users at the establishment.

Since the association of content and a POI is performed using geographic location comparison, content corresponding to and captured and/or generated at the geographic location is easily associated with the POI and may be viewable by others interested in or located proximate to the POI.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 3:
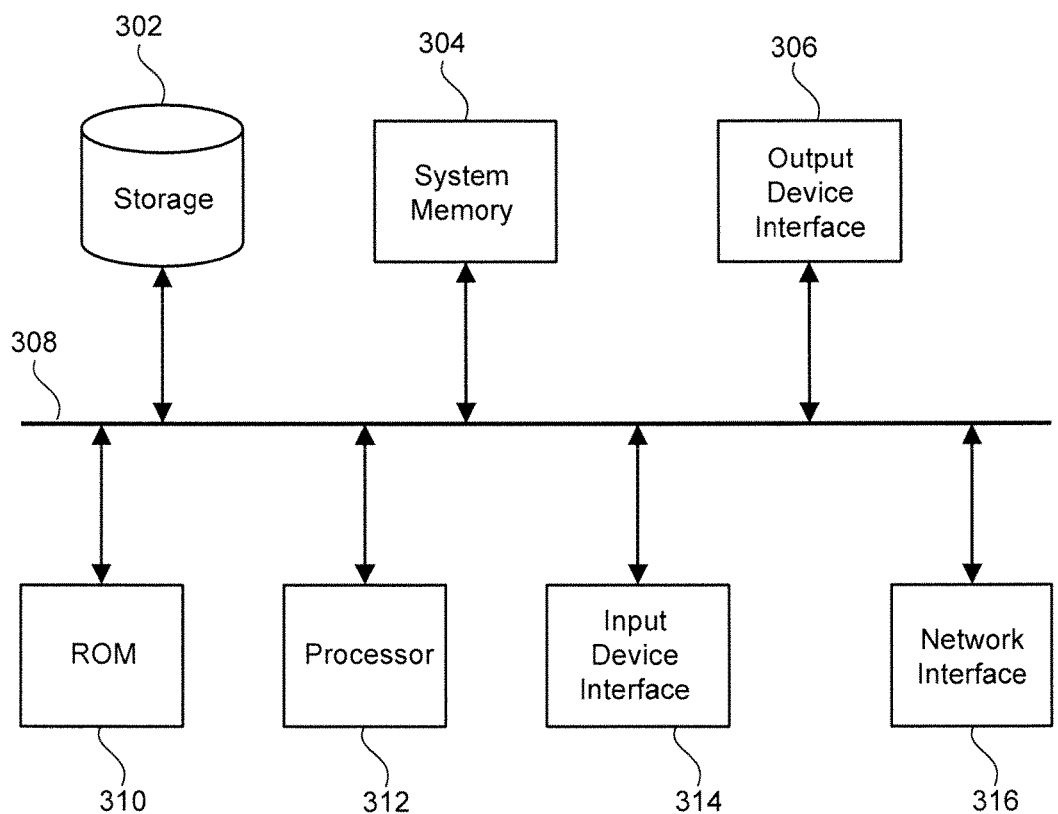
FIG. 3 conceptually illustrates an electronic system with which some implementations of the subject technology are implemented.

FIG. 3 conceptually illustrates an electronic system with which some implementations of the subject technology are implemented. Electronic system 600 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 300 includes a bus 308, processing unit(s) 312, a system memory 304, a read-only memory (ROM) 310, a permanent storage device 302, an input device interface 314, an output device interface 306, and a network interface 316.

Bus 308 collectively represents all system, peripheral, and chipset buses that communicatively connect the numerous internal devices of electronic system 300. For instance, bus 308 communicatively connects processing unit(s) 312 with ROM 310, system memory 304, and permanent storage device 302.

From these various memory units, processing unit(s) 312 retrieves instructions to execute and data to process in order to execute the processes of the subject disclosure. The processing unit(s) can be a single processor or a multi-core processor in different implementations.

ROM 310 stores static data and instructions that are needed by processing unit(s) 312 and other modules of the electronic system. Permanent storage device 302, on the other hand, is a read-and-write memory device. This device is a non-volatile memory unit that stores instructions and data even when electronic system 300 is off. Some implementations of the subject disclosure use a mass-storage device (such as a magnetic or optical disk and its corresponding disk drive) as permanent storage device 302.

Other implementations use a removable storage device (such as a floppy disk, flash drive, and its corresponding disk drive) as permanent storage device 302. Like permanent storage device 302, system memory 304 is a read-and-write memory device. However, unlike storage device 302, system memory 304 is a volatile read-and-write memory, such a random access memory. System memory 304 stores some of the instructions and data that the processor needs at runtime. In some implementations, the processes of the subject disclosure are stored in system memory 304, permanent storage device 302, and/or ROM 310. For example, the various memory units include instructions for facilitating a virtual content wall according to various implementations. From these various memory units, processing unit(s) 312 retrieves instructions to execute and data to process in order to execute the processes of some implementations.

Bus 308 also connects to input and output device interfaces 314 and 306. Input device interface 314 enables the user to communicate information and select commands to the electronic system. Input devices used with input device interface 314 include, for example, alphanumeric keyboards and pointing devices (also called "cursor control devices"). Output device interfaces 306 enables, for example, the display of images generated by the electronic system 300. Output devices used with output device interface 306 include, for example, printers and display devices, such as cathode ray tubes (CRT) or liquid crystal displays (LCD). Some implementations include devices such as a touchscreen that functions as both input and output devices.

Finally, as shown in FIG. 3, bus 308 also couples electronic system 300 to a network (not shown) through a network interface 316. In this manner, the computer can be a part of a network of computers (such as a local area network ("LAN"), a wide area network ("WAN"), or an Intranet, or a network of networks, such as the Internet. Any or all components of electronic system 300 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A machine-implemented method, the method comprising:
   receiving a content item generated at a user device;
   identifying a predetermined point of interest associated with a location of the user device;
   determining that the user device was at the point of interest for a threshold period of time before the content item was generated and when the content item was generated; and
   in response to determining that the user device was at the point of interest for the threshold period of time before the content item was generated and when the content item was generated, adding the content item to an existing set of content items corresponding to the predetermined point of interest,
   wherein each content item of the existing set of content items is associated with the predetermined point of interest.

2. The method of claim 1, further comprising:
   providing, based on a predetermined association between the set of content items and the predetermined point of interest, the set of content items for display in a virtual content wall associated with the point of interest.

3. The method of claim 1, wherein the content item comprises a photo captured at the point of interest.

4. The method of claim 1, wherein the point of interest is a defined establishment.

5. The method of claim 1, wherein the point of interest is an area associated with a short term event.

6. The method of claim 1, further comprising:
   determining a geographic location associated with the predetermined point of interest according to a geographic indicator associated with the predetermined point of interest.

7. The method of claim 1, wherein the location of the user device is a geographic location of the user device at a time of generating the content item.

8. The method of claim 1, further comprising:
   determining a geographic location associated with the content item, wherein the geographic location associated with the content item is determined according to a geotag associated with the content item.

9. The method of claim 1, further comprising:
   receiving an identification of the predetermined point of interest;
   comparing a geographic location associated with the point of interest to a geographic location associated with the content item; and
   determining that the geographic location associated with the content item is within a predefined distance associated with the point of interest.

10. A system for optimizing displaying of a rich web document to a user, the system comprising:
    one or more processors; and
    a machine-readable medium comprising instructions stored therein, which when executed by the processors, cause the processors to perform operations comprising:
    receiving a content item generated at a user device;
    identifying a predetermined point of interest associated with a location of the user device;
    determining that the user device was at the predetermined point of interest for a threshold period of time before the content item was generated and when the content item was generated; and
    in response to determining that the user device was at the predetermined point of interest for the threshold period of time before the content item was generated and when the content item was generated, adding the content item to an existing set of content items corresponding to the predetermined point of interest,
    wherein each content item of the existing set of content items is associated with the predetermined point of interest.

11. The system of claim 10, the operations further comprising:
    comparing a geographic location associated with the predetermined point of interest to a geographic location associated with the content item; and determining that the geographic location associated with the content item is within a predefined distance of the geographic location associated with the predetermined point of interest.

12. The system of claim 10, the operations further comprising:
providing, based on a predetermined association between the set of content items and the predetermined point of interest, the set of content items for display in a virtual content wall associated with the predetermined point of interest.

13. The system of claim 10, wherein the content item comprises a photo of patrons of the predetermined point of interest captured at the predetermined point of interest.

14. The system of claim 10, wherein the predetermined point of interest is a business or residence.

15. The system of claim 10, wherein the predetermined point of interest is an area associated with an event.

16. The system of claim 10, wherein the location of the user device is a geographic location of the user device at a time of generating the content item.

17. The system of claim 10, the operations further comprising:
determining a geographic location associated with the content item, wherein the geographic location associated with the content item is determined according to a geotag associated with the content item.

18. A non-transitory machine-readable medium comprising instructions stored therein, which when executed by a machine, cause the machine to perform operations comprising:
receiving a content item generated at a user device;
determining that the user device was at a predetermined point of interest for a threshold period of time before the content item was generated and when the content item was generated; and
in response to determining that the user device was at the predetermined point of interest for the threshold period of time before the content item was generated and when the content item was generated, adding the content item to an existing set of content items corresponding to the predetermined point of interest, wherein each content item of the existing set of content items is associated with the predetermined point of interest; and
providing, based on a predetermined association between the set of content items and the predetermined point of interest, the set of content items for display in association with the predetermined point of interest.

* * * * *